United States Patent [19]
Brick et al.

[11] 3,721,386
[45] March 20, 1973

[54] TEMPERATURE-VOLUME CONTROLLED MIXING VALVE

[76] Inventors: Julius H. Brick, 3 Bucknell Lane, Stony Brook, 11790; Wilfred Olschewski, 470 American Blvd., Brentwood both of N.Y. 11717

[22] Filed: Oct. 23, 1970

[21] Appl. No.: 83,289

[52] U.S. Cl. ............................ 236/12 A, 137/625.41
[51] Int. Cl. ................................................ G05d 23/13
[58] Field of Search ........... 236/12, 12 A, 91; 165/38; 137/625.41, 636.4

[56] References Cited

UNITED STATES PATENTS

| | | | |
|---|---|---|---|
| 902,600 | 11/1908 | Penniman | 236/12 A |
| 3,322,342 | 5/1967 | Veale | 236/12 A |
| 2,943,792 | 7/1960 | Moen | 236/12 |
| 3,232,336 | 2/1966 | Leslie et al. | 165/38 |
| 2,404,597 | 7/1946 | McClain | 236/91 |
| 1,636,698 | 7/1927 | Leonard et al. | 236/12 UX |
| 2,267,976 | 12/1941 | Hermann | 236/12 |
| 2,603,420 | 7/1952 | Tacchi | 236/12 |

Primary Examiner—William E. Wayner
Attorney—Shaffert and Miller

[57] ABSTRACT

Means are disclosed for producing a fluid output having a desired temperature comprising a mixing unit, means for introducing a first fluid having a first temperature into said mixing unit, means for introducing a second fluid having a second temperature into said mixing unit, said mixing unit including means to mix said first and second fluids to yield a third fluid having a third temperature, means to sense said third temperature, means to generate a signal representative of said desired temperature, means to generate a signal representative of said third temperature, means to compare said desired temperature signal and said third temperature signal, said comparing means including means to generate a control signal representative of said comparison, and means to couple said control signal to said mixing unit to control the operation of said mixing unit to bring the temperature of said third fluid to said desired temperature.

14 Claims, 8 Drawing Figures

INVENTORS,
JULIUS H. BRICK
WILFRED OLSCHEWSKI

INVENTORS,
JULIUS H. BRICK
WILFRED OLSCHEWSKI

TEMPERATURE-VOLUME CONTROLLED MIXING VALVE

This invention relates to means for producing a fluid output of a desired temperature. Most particularly, this invention relates to a means for producing a fluid output having a desired temperature wherein said fluid output occurs as a result of the mixing of a plurality of input fluids having different temperatures.

In many industrial applications and even for home use, it is important to be able to tap a fluid of a desired temperature. Due to economic and other considerations, input fluids are usually of a predetermined temperature which cannot be varied without considerable expense and difficulty. Accordingly, in order to realize a fluid output of a desired temperature without adding energy in the form of heat to the input fluids, it is necessary to combine the input fluids in such a manner that, once mixed, the resultant fluid possesses the desired temperature.

Accordingly, it is an object of the present invention to provide a control system capable of combining input fluids of varying temperatures to yield an output fluid of a desired temperature.

It is further an object of the present invention to provide a mixing unit which regulates the input of fluids at relatively uncontrolled temperatures in order to produce an output fluid of a desired temperature.

It is yet another object of the present invention to produce a control system that constantly monitors the temperature of an output fluid and compares said temperature with a desired temperature and, if the two are found to differ, generates a control signal to bring the temperature of the output fluid to the desired temperature.

In summary, the operation of the present invention is as follows. By means of a manually operable graduated knob attached to shaft 102, a desired temperature is set into the device. Rotation of shaft 102 transmits motion through gear assembly 104 to set potentiometer 98 at a given value and to rotate mixing chamber 40 about the longitudinal axis of shaft 42. Potentiometer 98 now functions as an electronic reference point of desired output temperature and slot 44 of mixing chamber 40 will be set to control the input of fluid through conduits 12 and 14 so that, with pre-calculated average line temperature, the mixed fluid that will issue from outlet 22 will be at the desired temperature. At this point in operation, o-ring 48 is still physically below (with reference to FIG. 2) inlets 12 and 14 so no fluid is passing into chamber 40.

A manually operable knob attached to shaft 78 is now rotated to in turn rotate cams 80, 82 and 90. Cam 80 works through lever 60 to raise and lower mixing chamber 40 in its housing to regulate the flow rate of fluid into, and thus out of, chamber 40. This control is achieved by varying the amount of slot 44 that is exposed to inlets 12 and 14. To assure that a pre-determined minimum flow rate is achieved before the control system is electrically actuated, cam 90 has a rise portion that holds switch 74 open until notch 84 of cam 82 is aligned with detent 66. At this point, spring arm 76 falls to the dwell portion of cam 90, and switch 74 closes. Cam 80, of course, has, through lever 60, raised the mixing chamber to a position assuring the previously mentioned predetermined flow rate. Increased flow can be achieved by further rotation of shaft 78 and attached cams as determined by the alignment of various of the notches 86 with detent 66.

Figure 1:
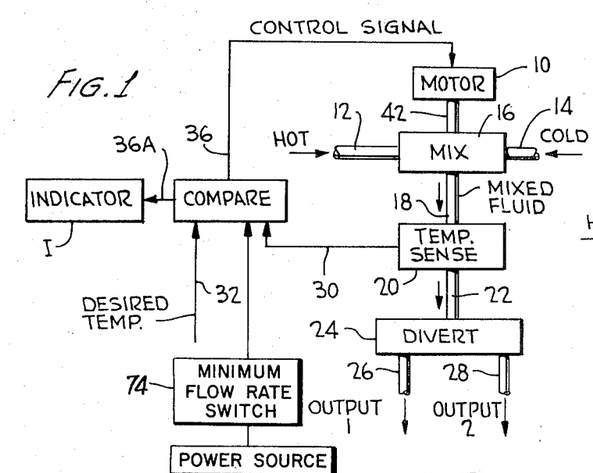
FIG. 1 is a flow chart of a control system in accordance with the present invention.

When switch 74 closes, power from a battery or the like energizes the control circuitry shown in FIG. 1. Temperature sense means 20 senses the temperature in the fluid in outlet 22. Sense means 20 is connected to the compare unit by transmitting means 30 and transmits a signal to the compare unit that is representative of the actual outlet fluid temperature. This signal is compared to the signal representative of the desired temperature as set into potentiometer 98. If the signals differ, an electrically amplified control signal having a magnitude representative of the comparison is transmitted through connector 36 and contacts 110, 112 to motor 10. Motor 10 then drives shaft 42 to rotate chamber 40 and adjust the quantity of fluid flowing through inlets 12 and 14 to thereby modify the temperature of the fluid being mixed in chamber 40. As previously mentioned, this rotation of chamber 40 will not be accompanied by a rotation of shaft 96 and thus the existing setting of potentiometer 98 will not be affected.

Emergency shut-off of the system may be effected by manual actuation of shaft 92 which will open switch 74.

It is still another object of the present invention to provide a mechanism for controlling the rate of flow of output fluid.

It is still another object of the present invention to provide means for a visual indication that the output temperature has reached the desired temperature.

It is still another object of this invention to provide means for automatically adding heat to the hot supply line when the temperature of the hot supply is not adequate to yield the desired temperature.

Other objects will appear hereinafter.

These and other objects of the present invention are achieved utilizing a control system wherein a plurality of fluids at varying temperatures are combined in such a manner as to yield an output fluid of a desired temperature. The temperature of the output fluid is constantly monitored and when it differs from a predetermined desired temperature, a control signal is generated to regulate the mixing unit of the control system in order to bring the output fluid to the desired temperature.

In accordance with the present invention, a novel mixing unit is provided wherein rotation of the mixing unit regulates the temperature of the output fluid by mixing the input fluids in varying proportions. Further, and in accordance with the present invention, means are provided for positioning the mixing unit along its axis of rotation in order to regulate the rate of flow of output fluid. The mechanism for positioning the mixing unit along its axis of rotation includes an electrical switch, which deactivates the temperature control system whenever the volumetric flow rate is below a predetermined minimum flow rate for stable operation of the temperature control system.

For the purpose of illustrating the invention, there is shown in the drawing an embodiment of the present invention, it being understood, however, that the invention is not limited to the precise arrangements and instrumentalities shown.

Referring more particularly to the drawings wherein like numerals designate like elements, there is shown in FIG. 1 a control system in flow chart form. The system illustrated in FIG. 1 could be utilized in a home to control the temperature and rate of flow of fluid for a bath fixture or a shower fixture.

As shown in FIG. 1, there are two fluid input lines to mixing unit 16. Input line 12 conveys fluid that is at a temperature higher than the desired output temperature whereas input line 14 conveys fluid at a temperature lower than that of the desired output temperature. As stated above, in the usual situation, the temperature of the input fluids are not subject to control. For example, if the control system shown on FIG. 1 is utilized in a home, the hot fluid would have a temperature of about 160° F. whereas the cold fluid could be at ambient temperature, or lower.

As will be more fully explained hereinafter with reference to FIG. 2 and 3, mixing unit 16 selectively mixes and combines the fluids from input line 12 and input line 14. The mixed fluid is conveyed by conduit 18 through a temperature sense unit 20. Temperature sense unit 20 includes means to generate an electrical signal representative of the temperature of the fluid.

The positioning of temperature sense unit 20 is of great importance. If temperature sense unit 20 is positioned too close to mixing unit 16, flow stratification results and temperature sense unit 20 will not generate an accurate signal since the stratified layers of fluid will be at different temperatures. On the other hand, if temperatures sense unit 20 is positioned too far from mixing unit 16, excessive transport lag results and temperature sense unit 20 will not sense a change in fluid temperature occurring in mixing unit 16 until after a relatively long delay. Accordingly, temperature sense unit 20 should be so positioned from mixing unit 16 so as to minimize the undesirable effects of both flow stratification and transport lag. Such a position for temperature sense unit 20 may be, for example, about one and one-fourth inches from the geometric center of fluid mixing in unit 16.

It is also important that temperature sense unit 20 be of such a design that its insertion into the stream of flow will not cause undue resistance to the flow.

This signal representative of the temperature of the fluid is conveyed from temperature sense unit 20 to compare unit 34 by conductor 30. The other input to compare unit 34 is conductor 32 over which is transmitted a signal representative of the desired temperature of the output fluid.

Compare unit 34 performs the functions of determining whether the fluid output temperature signal is equal to the desired temperature signal, and providing drive current to the motor 10 and indicator I. Compare unit 34 may take the form of a differential amplifier, associated power supplies, and other circuitry capable of performing such functions as comparison, null detection, and power amplification.

The signal generated in conductor 36 by compare unit 34 may take one of many forms. For example, this signal could be representative of the polarity of the fluid temperature as compared to the desired temperature as well as being representative of the magnitude of the fluid temperature as compared to the desired temperature. In such an instance, motor 10 which rotates mixing unit 16 through shaft 42 could be rotated by different amounts depending upon the magnitude of the signal transmitted by conductor 36. The polarity of the signal would, of course, determine the direction of rotation. At predetermined intervals, the temperature of the output fluid would be sensed to determine if it had reached the desired temperature, and if it had not, motor 10 would further rotate shaft 42 to achieve this end.

Alternatively, compare unit 34 could generate a signal that is representative only of the polarity of the fluid temperature as compared to the desired temperature. Such a signal would, preferably, be of a predetermined magnitude irrespective of whether the polarity was positive or negative. Motor 10 would then rotate shaft 42 a predetermined amount in a direction determined by the polarity of the signal. After a predetermined period, if the signal representative of the temperature of the output fluid was not equal to the desired temperature signal, another control signal would be generated to again rotate motor 10 and therefore shaft 42. This process would be repeated until the output fluid temperature reached the desired temperature.

If the result of rotating motor 10 were quickly reflected in the output of temperature sense unit 20, it would be possible to have the signal transmitted over conductor 36 continuously rotate motor 10 until the desired fluid temperature was reached. If this were the mode of operation, compare unit 34 could be designed to generate a signal of predetermined voltage whose polarity or phase would indicate the desired direction of rotation of motor 10 to bring the temperature of the output fluid to the desired temperature.

The signal generated in conductor 36A by compare unit 34 drives an indicator I to display the condition that the output temperature 30 is equal to the desired temperature 32 within preset limits. This indication can be of many forms including lamps, meter displays, or flag displays.

As shown in FIG. 1, the fluid flows from temperature sense unit 20 through conduit 22 and into divert unit 24. Divert unit 24 divides the flow therein into output 1 transmitted by conduit 26 and output 2 transmitted by conduit 28. If the control system shown in FIG. 1 is employed for home use conduit 26 could lead to a bath fixture while conduit 28 could lead to a shower fixture.

Figure 1A:
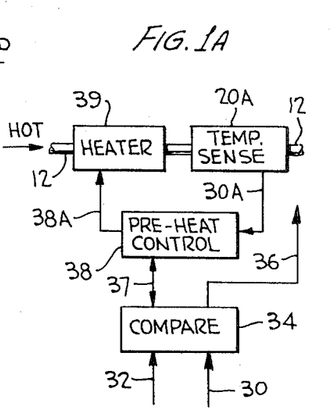
FIG. 1A is a flow chart of a portion of a control system that may be added to the system of FIG. 1 including means to automatically pre-heat the hot supply line in accordance with the present invention.

FIG. 1A illustrates an optional pre-heat or supplemental heating feature of the instant invention. Compare unit 34 performs the same function as previously described — that is, the comparison of signals 30 and 32 and the generation of output control signal 36. Compare unit may also generate a signal 37 which is fed to pre-heat control device 38. The function of pre-heat control device 38 is to generate a signal to actuate heater 39, located in hot supply line 12, if temperature sense unit 20A senses too low an input fluid temperature and relays such information through signal 30A to preheat control 38. When pre-heat control 38 receives such a signal it in turn sends signal 38A to heater 39. Heater 39 may be, for example, cal-rods or heating coils wrapped around input pipe 12.

Figure 2:
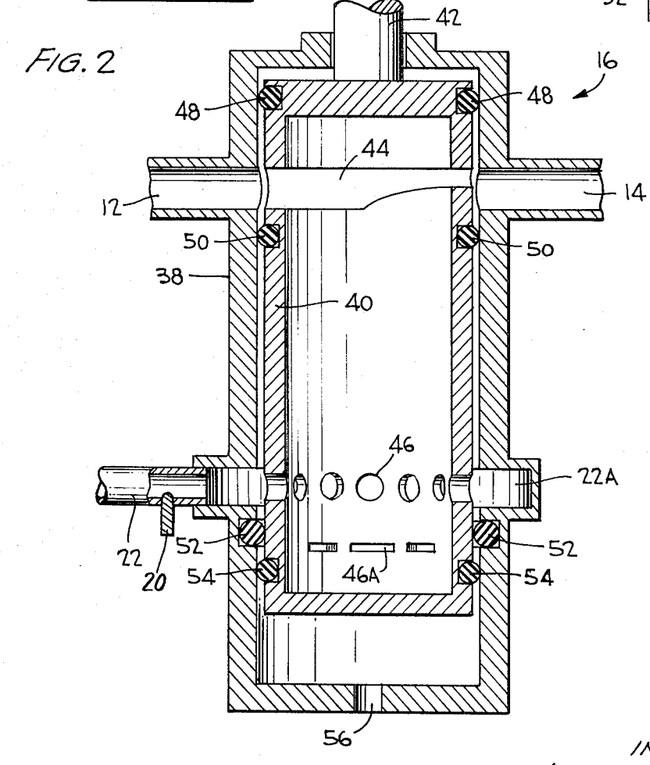
FIG. 2 is a cross sectional view of a mixing unit in accordance with the present invention wherein the mixing chamber is positioned for maximum output flow.

FIG. 2 shows in greater detail the structure of mixing unit 16. Generally mixing unit 16 is comprised of housing 38 having mixing chamber 40 rotatably disposed therein. Mixing chamber 40 is a cylindrical chamber closed at both ends and has a shift 42 rigidly secured to the top portion thereof. Mixing chamber 40 contains both input opening 44 and output openings 46. Input opening 44 can be contoured to provide inherent linearity in output temperature with angular position of mixing chamber 40 by narrowing the input slot on one portion of the mixing chamber wall. This slot may, for example, extend approximately 180° around the circumference of the mixing chamber wall with the ports of the input lines 12 and 14 extending about 30° each.

As is shown in FIG. 2 input lines 12 and 14 are both in proximity to input opening 44. In the position shown in FIG. 2, input line 12 will feed more fluid into mixing chamber 40 than input line 14. As is readily apparent, the rotation of mixing chamber 40 by 180° would result in more fluid being supplied by input line 12. Of course, it is not necessary that the shaped opening shown be used, but, rather it is well within the scope of the invention to utilize any shaped opening that will perform the desired mixing function.

Since both ends of mixing chamber 40 are sealed, the fluid entering input opening 44 has no exit except through output openings 46. As shown in FIG. 2, output openings 46 are circular in shape. However, it is well within the scope of the present invention to utilize other shapes for the output openings that will perform the desired functions.

It is a natural consequence of the design of the mixing chamber 40 that there is virtually no pressure gradient between the closed ends. Thus, there is force balance and the chamber will hold any set axial position between zero and maximum flow rate.

For reasons which will be more fully explained with reference to FIG. 3, mixing chamber 40 may be positioned along its axis of rotation in order to regulate the rate of output flow. In order to prevent an undesirable build up in pressure in housing 38 as mixing chamber 40 is moved downwardly, housing 38 is provided with opening 56. Since both the upper and lower ends of the housing are open to the atmosphere, the movement of mixing chamber 40 is unrestricted by any pressure build up.

The operation of mixing chamber 40 may be best explained with reference to FIGS. 2 and 3. As is shown in FIG. 2, fluid flowing through input lines 12 and 14 enters mixing chamber 40 through input opening 44. In the position shown in FIG. 2, more fluid from input line 12 than input line 14 enters input opening 44. However, as noted above, the rotation of mixing chamber 40 by motor 10 acting through shaft 42 can so position mixing chamber 40 so that more fluid from input line 14 than from input line 12 enters input opening 44. Since input lines 12 and 14 are not always perfectly aligned with input opening 44, O-rings 48 and 50 are provided to seal off the clearance between the interior of housing 38 and the exterior of mixing chamber 40 in the vicinity of input opening 44. Therefore, any fluid exiting from input lines 12 and 14 will be confined to the area between O-rings 48 and 50 and will therefore eventually enter input opening 44.

Since mixing chamber 40 is closed at its bottom and top portions, any fluid entering input opening 44 must exit from output openings 46. In the same manner that O-rings 48 and 50 provide a seal about input opening 44, O-rings 50 and 52 provide a seal about output openings 46. Because of the seal provided by O-rings 50 and 52, all fluid exiting from output openings 46, in the position shown in FIG. 2, is directed into annular output space 22A and is ultimately directed into output conduit 22. Annular output space 22A is formed in housing 38 and completely surrounds mixing chamber 40.

As mentioned above, mixing chamber 40 may be displaced along its axis of rotation in order to regulate the rate of flow of output fluid. As shown in FIG. 3, mixing chamber 40 has been positioned downwardly with respect to housing 38 and is in a lower position than that shown in FIG. 2. Since O-rings 48, 50 and 54 are carried by the exterior surface of mixing chamber 40, these O-rings move therewith. O-ring 52 is mounted on the interior surface of housing 38 and therefore is not displaced by the movement of mixing chamber 40.

Figures 3, 4, 5:
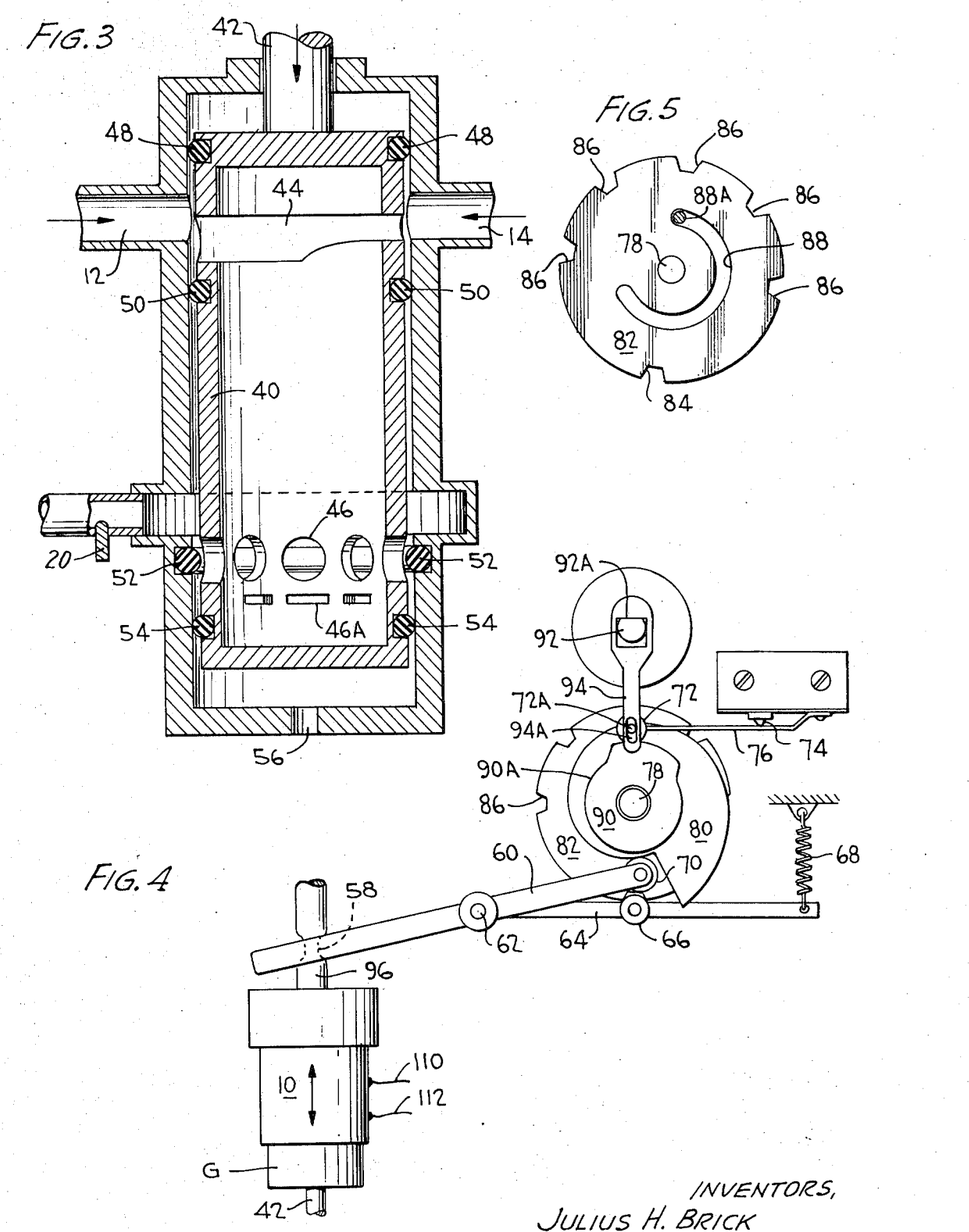
FIG. 3 is a cross sectional view of a mixing unit in accordance with the present invention wherein the mixing chamber is positioned for non-maximum output flow.
FIG. 4 is an elevation view of a mechanism in accordance with the present invention utilized to position the mixing chamber along its axis of rotation and thereby regulate the flow of output fluid.
FIG. 5 is a view in elevation of the notched disc shown in FIG. 4.

As shown in FIG. 3, all fluid exiting from input lines 12 and 14 flows into input opening 44 since input lines 12 and 14 still lie within the area bounded by O-rings 48 and 50. However, all fluid exiting from output openings 46 is not directed to output conduit 22. Only those portions of output openings 46 that are above O-ring 52 permit fluid passing therethrough to be directed to output conduit 22. The remainder of the fluid that passes through output openings 46 is confined to the area between O-rings 52 and 54. Therefore, it may be readily seen that a downward positioning of mixing chamber 40 results in a reduction of the rate of flow of output fluid since both the inlet and the exit areas available for output flow are reduced. As seen in FIGS. 2 and 3, outlets 46 are not limited to one size.

It should be clear that O-rings 48 and 50 may alternatively be mounted in suitable positions on the interior wall of housing 38 to achieve the same effects previously described.

Slots 46A are provided in the lower wall of mixing chamber 40. When mixing chamber 40 is displaced so that flow is fully cut off and output openings 46 are below O-ring 52, some fluid will enter and is trapped in the space between O-ring 52 and O-ring 54 that surrounds the exterior of mixing chamber 40. When the mixing chamber is again displaced so that flow may begin, this trapped fluid may flow into the interior of the chamber through slots 46A.

FIGS. 4 and 5 show in greater detail the mechanism utilized to position mixing chamber 40 along its axis of rotation to control the rate of output flow. As shown in FIG. 4, shaft 96 is connected to motor 10. From FIG. 1 it may be seen that motor 10 is connected to shaft 42 which is connected to mixing chamber 40. Therefore, movement of shaft 96 will effect a movement of mixing chamber 40.

Referring again to FIG. 4, cams 80 and 90 and disc 82 are concentrically mounted to rotate about shaft 78. Cams 80 and 90 and disc 82 are rigidly connected and therefore rotate together. Cam follower 70 is positioned to ride about the periphery of cam 80. Cam follower 70 is rotatably connected to arm 60 which is connected to shaft 96 by sliding connection 58. Arm 60 is mounted so as to pivot about rotary coupling 62. Therefore, as cam follower 70 travels about the periphery of cam 80, arm 60 will pivot about rotary coupling 62 which in turn causes the upward or downward movement of shaft 96. Connection 58 is a necked-down section of shaft 96 over which the forked end of arm 60 fits and which allows shaft 96 and its attached mixing chamber 40 to be raised substantially vertically within housing 38, regardless of the angular position of shaft 96 and the mixing chamber.

Cam follower 72 is rotatably mounted on spring arm 76 and rides on the periphery of cam 90. In the zero flow, or off position follower 72 is on the rise portion of cam 90, deflecting spring arm 76 and depressing switch contact 74. In this mode no electrical power can flow to the electronic circuits and consequently no power can be delivered to motor 10.

When shaft 78 is manually rotated, cams 80 and 90 and disc 82 all rotate with it and at the same time. Cam follower 70, riding on the periphery of cam 80, is moved radially outward or downward in FIG. 4, thereby pivoting arm 60 about rotary coupling 62 and causing shaft 96, motor 10 and mixing chamber 40 to move upwards through the action of sliding connection 58. This upward motion positions slot 44 relative to the inlet lines 12 and 14, thereby providing a volume or flow rate control.

Arm 64 is mounted to rotary coupling 62 at one end and to spring 68 at the other end. Detent roller 66, which is rotatably mounted to arm 64, is aligned with the periphery of disc 82. Disc 82 has a plurality of notches on its periphery into which detent roller 66 can fall under the influence of spring 68. One of these notches, visible in FIG. 5 as 84, corresponds to and identifies the zero flow rate position of shaft 78, and the remaining notches 86 identify predetermined flow rates. The function of notched disc 82 is to aid the user in identifying and maintaining certain fixed flow rates by providing a discernable "click" positioner.

Continued rotation of shaft 78 from the zero flow rate position causes the dwell portion 90A of cam 90 to reach cam follower 72. The cam follower then falls to the dwell, releasing spring arm 76 and switch contact 74. The switch is now on, and power can flow to the electronic circuits. The circuits are not activated but no power will flow to motor 10 unless there is a difference between the desired temperature and the output temperature. When cam 90 is rotated to the point where the electronic circuits are activated, detent roller 66 falls into the first of notches 86 which corresponds to the minimum flow rate for which automatic control can be achieved.

FIG. 5 shows in greater detail an elevation view of disc 82. Notch 84 is for the zero flow, or "off" position, and notches 86 are for the preset, readily identifiable flow rates. Arcuate cut-out 88 houses the motive end of a torsion spring 88A. The fixed end of the torsion spring is restrained to metal housing 200 (FIG. 7) behind disc 82. The purpose of torsion spring 88A is to automatically drive disc 82 in a direction that will permit detent 66 to engage the first, minimum flow notch 86. This first notch represents the position for the minimum amount of flow possible for automatic temperature control. When this position has been reached there is no more stored energy in the spring. Higher flow rates are obtained by manually rotating shaft 78 in the same direction. When shaft 78 is turned back to the "off" position, the torsion spring becomes re-wound and is ready for the next usage.

Rotatable shaft 92 has located thereon a flat cut 92A, and carries therewith vertical arm 94. Arm 94 has a rectangular cut-out in one end, the top edge of which sits on flat 92A. Arm 94 also has an elongated slot 94A in its other end portion which encompasses an extension of pivot pin 72A of cam follower 72. In the position shown for arm 94, the pin extension is in the upper extreme of the elongated slot 94A, and when the dwell portion 90A of cam 90 is under cam follower 72, the cam follower can drop and activate switch 74 and the electronic circuits.

If it should be desired to manually deactivate the system regardless of the position of shaft 78, shaft 92 may be rotated about its axis, thus bringing the cylindrical portion of the shaft 92 to bear against the upper edge of the rectangular cut-out in arm 94. Arm 94 will rotate about shaft 92, thereby causing the lower portion of elongated slot 94A to bear against the pin extension 72A of cam follower 72. In this position, cam follower 72 is not free to drop on the dwell 90A of cam 90, and the switch and electronic circuits cannot be activated.

Figures 6, 7:
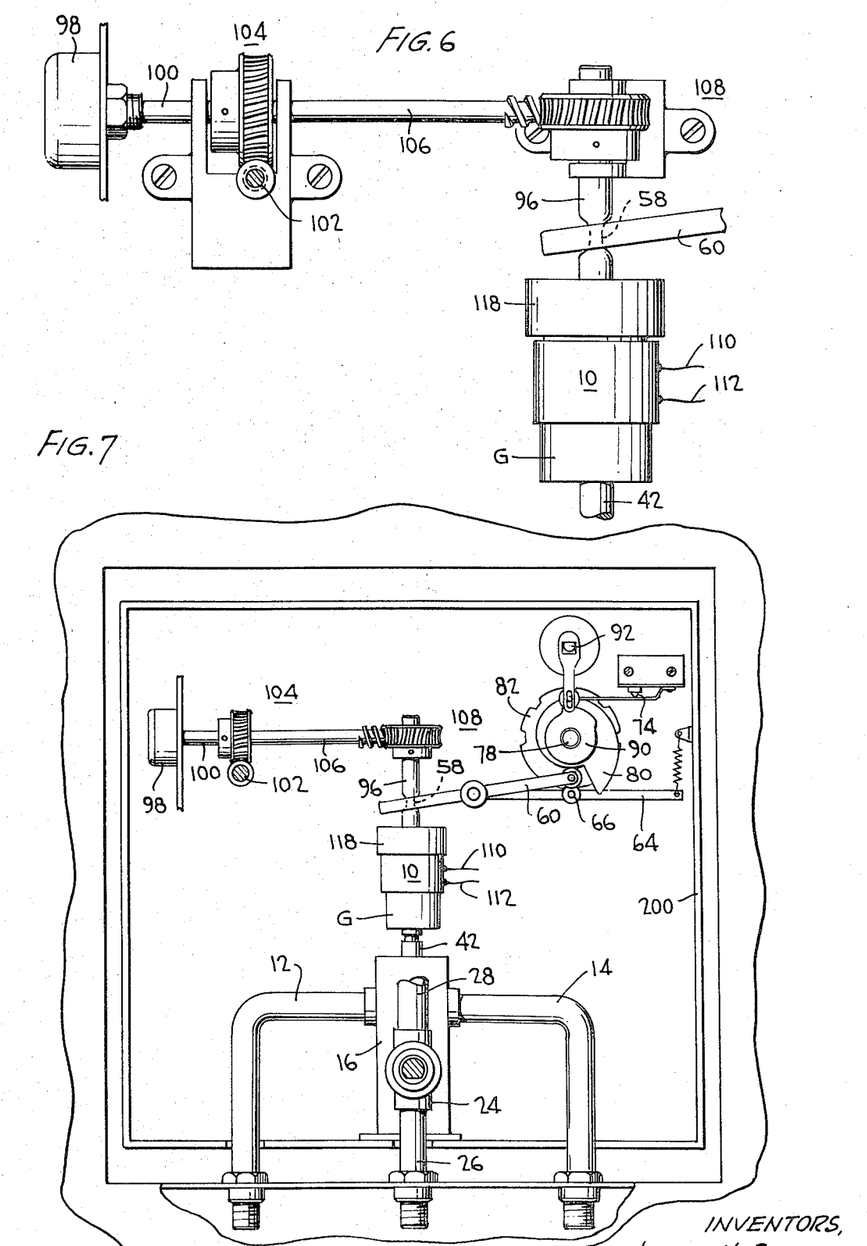
FIG. 6 is a view in elevation illustrating the manner in which the desired temperature signal is entered into the control system.
FIG. 7 is a view in elevation showing the positional relationships of the two shafts that are operator-controlled to set the desired temperature and desired rate of flow output.

FIGS. 6 and 7 illustrate how the desired temperature signal is entered into the control system of FIG. 1 and how the operation of the system is controlled by an operator. The operator of the system, in order to select the desired temperature, merely rotates shaft 102 which is preferably mounted in connection with some form of temperature dial for the operator to observe. Shaft 102 is connected to worm and helical gear 104 which effects a motion transfer of 90° and thereby rotates shafts 100 and 106. The rotation of shaft 100 sets potentiometer 98 to a position corresponding to the desired temperature level. Since shaft 106 is connected to worm and helical gear 108 which is connected to shaft 96 and motor housing coupling 118, the rotation of shaft 102 also rotates motor 10, coupling 118, shaft 42 and mixing unit 16 which is connected thereto thereby providing an initial setting for mixing unit 16.

At this point, it is important to note that motor 10 and gear assembly G are a conventional motor and gear head used in a differential mode and have the characteristic that the rotation of shaft 96 must produce rotation of shaft 42 but the rotation of shaft 42 by motor action does not produce rotation of shaft 96. Accordingly, the rotation of shaft 42 by motor 10 in response to a control signal will position mixing chamber 40 but, because of the substantial irreversibility of the gear train, will not change the setting of potentiometer 98.

Motor 10 receives power through wires 110 and 112.

The control of the system shown in FIG. 7 is accomplished by selective rotation of shafts 78, 102 and, if desired, 92. The rotational position of shaft 78 determines the rate of flow of output fluid whereas the rotational position of shaft 102 determines the temperature of the output fluid. Shaft 92 is used to manually deactivate the system as previously described. As is apparent, the rate of flow is fixed until again changed by the operator but the temperature mix position of chamber 40 will be constantly adjusted in response to signals from the sensing unit.

The present invention may be embodied in other specific forms without departing from the spirit or essential attributes thereof all of which are intended to be encompassed be the appended Claims.

We claim:

1. Apparatus for producing a fluid output having a desired temperature comprising a mixing unit, means for introducing a first fluid having a first temperature into said mixing unit, means for introducing a second fluid having a second temperature into said mixing unit, said mixing unit including means to vary the respective flow rates of fluid passing through said first and second fluid introducing means and means to mix said first and second fluids to yield a third fluid having a third temperature, means to sense said third temperature, first generating means to generate a signal representative of said desired temperature, second generating means connected by transmitting means to said third temperature sensing means for generating a signal representative of said third temperature, means for comparing said desired temperature signal and said third temperature signal, the improvement comprising said first generating means, said second generating means and said comparing means all being energized by means actuated only after the achievement of a pre-determined minimum flow rate from said mixing unit, said comparing means including means to generate an electrically amplified control signal having a magnitude representative of said comparison, and means to couple said control signal to said mixing unit to bring the temperature of said third fluid to said desired temperature.

2. The apparatus according to claim 1 wherein said operation of said mixing unit is controlled in a manner to tend to reduce said control signal to zero and including means to produce a visual signal upon such reduction to zero.

3. Means for producing a fluid output having a desired temperature in accordance with claim 1 wherein said mixing unit comprises a housing, a cylindrical chamber mounted for rotation about its axis within said housing, said chamber having an input opening, means to introduce said first fluid at a first temperature and said second fluid at a second temperature into said input opening and means to rotate said chamber and input opening to control the amount of said first fluid and the amount of said second fluid entering said chamber in order to bring the temperature of said third fluid to said desired temperature.

4. Means for producing a fluid output having a desired temperature in accordance with claim 3 wherein said means to sense said third temperature is so positioned from said mixing unit as to minimize the effects of flow stratification and transport lag.

5. Means for producing a fluid output having a desired temperature in accordance with claim 3 wherein said input opening is a contoured slot and wherein said output opening comprises a plurality of openings.

6. Means for producing a fluid output having a desired temperature in accordance with claim 3 including means to position said chamber along said axis of rotation in order to regulate the rate of flow of said third fluid from said output opening.

7. Apparatus according to claim 6 further including an operator accessible first shaft whose rotational position determines the temperature of the output fluid and an operator accessible second shaft whose rotational position determines the rate of flow of output fluid.

8. Apparatus according to claim 3 wherein said means to rotate said chamber and input opening includes an electric motor and an attached gear head with said gear head having an output shaft attached to said chamber.

9. Means for producing a fluid output having a desired temperature in accordance with claim 1 including means to preheat the fluid in one of said means for introducing a first fluid and said means for introducing a second fluid, second temperature sensing means to sense the temperature of fluid in said one of said means, and means to actuate said means to preheat the fluid if said second temperature sensing means senses that the temperature of the fluid in said one of said means is insufficient to permit said third temperature to equal said desired temperature.

10. Means for producing a fluid output having a desired temperature in accordance with claim 1 including manual means to render said mixing unit inoperable.

11. Apparatus for producing a fluid output having a desired temperature comprising a mixing unit, means for introducing a first fluid having a first temperature into said mixing unit, means for introducing a second fluid having a second temperature into said mixing unit, said mixing unit including means to mix said first and second fluids to yield a third fluid having a third temperature, means to sense said third temperature, means to generate a signal representative of said desired temperature, means to generate a signal representative of said third temperature, means to compare said desired temperature signal and said third temperature signal, said comparing means including means to generate a control signal representative of said comparison, and means to couple said control signal to said mixing unit to control the operation of said mixing unit to bring the temperature of said third fluid to said desired temperature, said mixing unit comprising a housing, a cylindrical chamber mounted for rotation about its axis within said housing, said chamber having an input opening, means to introduce said first fluid at a first temperature and said second fluid at a second temperature into said opening and means to rotate said chamber and input opening to control the amount of said first fluid and the amount of said second fluid entering said chamber in order to bring the temperature of said third fluid to said desired temperature, means to position said chamber along said axis of rotation in order to regulate the rate of flow of said third fluid from said output opening, wherein said positioning means comprises a cam, means to rotate said cam, a cam roller position to travel about the periphery of said cam, cam arm means connected to said cam roller at a first point and to said chamber at a second point, and means to rotate said cam arm means about an axis positioned between said first and second points to position said chamber substantially along its axis.

12. Apparatus according to claim 11 further including a rotatable disc rigidly connected to said cam, said rotatable disc having a plurality of notches in its periphery, and a disc roller means positioned to travel about the periphery of said disc and to enter said plurality of notches to provide readily identifiable detent positions corresponding to fixed increments of flow rate.

13. Apparatus for producing a fluid output having a desired temperature comprising a mixing unit, means for introducing a first fluid having a first temperature into said mixing unit, means for introducing a second fluid having a second temperature into said mixing unit, said mixing unit including means to mix said first and second fluids to yield a third fluid having a third temperature, means to sense said third temperature, means to generate a signal representative of said desired temperature, means to generate a signal representative of said third temperature, means to compare said desired temperature signal and said third temperature signal, said comparing means including means to generate a control signal representative of said comparison, and means to couple said control signal to said mixing unit to control the operation of said mixing unit to bring the temperature of said third fluid to said desired temperature, said mixing unit comprising a housing, a cylindrical chamber mounted for rotation about its axis within said housing, said chamber having an input opening, means to introduce said first fluid at a first temperature and said second fluid at a second temperature into said input opening and means to rotate said chamber and input opening to control the amount of said first fluid and the amount of said second fluid entering said chamber in order to bring the temperature of said third fluid to said desired temperature, said means to rotate said chamber and input opening including an electric motor and an attached gear head with said gear head having an output shaft attached to said chamber, and further including shaft means to manually set said desired temperature, means connecting said shaft means to said motor so that said motor is initially positioned by said shaft means and said gear head comprising means to operate in a differential mode whereby said control signal to said mixing unit will cause said motor to position said chamber without affecting said shaft means so that said manually set desired temperature remains unaffected by said positioning of said chamber.

14. Apparatus according to claim 1, wherein said mixing unit comprises a housing, a chamber mounted for rotation about its axis within said housing, said chamber having an inlet opening and an outlet opening, and said means for sensing said third temperature being located in a position relative to said outlet opening so as to minimize the effects of flow stratification and transport lag.

* * * * *

UNITED STATES PATENT OFFICE
CERTIFICATE OF CORRECTION

Patent No. 3,721,386          Dated March 20, 1973

Inventor(s) Julius H. Brick et al

It is certified that error appears in the above-identified patent and that said Letters Patent are hereby corrected as shown below:

Column 5, line 26: "shift" should be --shaft--

Colume 7, line 64: "not" should be --now--

Signed and sealed this 7th day of May 1974.

(SEAL)
Attest:

EDWARD M.FLETCHER,JR.
Attesting Officer

C. MARSHALL DANN
Commissioner of Patents